United States Patent
Shin et al.

(10) Patent No.: US 7,253,849 B2
(45) Date of Patent: *Aug. 7, 2007

(54) MULTI-DOMAIN LIQUID CRYSTAL DISPLAY AND A THIN FILM TRANSISTOR SUBSTRATE OF THE SAME

(75) Inventors: Kyoung-Ju Shin, Kyungki-do (KR); Hee-Seob Kim, Kyungki-do (KR); Sung-Kyu Hong, Kyungki-do (KR); Baek-Woon Lee, Kyungki-do (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/510,013

(22) PCT Filed: Jul. 24, 2002

(86) PCT No.: PCT/KR02/01392

§ 371 (c)(1),
(2), (4) Date: May 17, 2005

(87) PCT Pub. No.: WO03/096114

PCT Pub. Date: Nov. 20, 2003

(65) Prior Publication Data

US 2005/0206795 A1  Sep. 22, 2005

(30) Foreign Application Priority Data

May 9, 2002  (KR) .......................... 2002-0025536

(51) Int. Cl.
*G02F 1/1368* (2006.01)
*G02F 1/139* (2006.01)
*H01L 21/336* (2006.01)
*H01L 29/786* (2006.01)

(52) U.S. Cl. .......................... 349/43; 349/38; 349/48; 349/129; 349/187; 257/59; 438/30

(58) Field of Classification Search ................. 349/38, 349/43, 48, 128, 129, 139, 167, 177, 187; 257/59, 72; 438/30
See application file for complete search history.

(56) References Cited

U.S. PATENT DOCUMENTS

| 6,278,503 B1 | 8/2001 | Nishikawa et al. |
| 6,407,791 B1 * | 6/2002 | Suzuki et al. ............... 349/129 |
| 6,717,631 B2 * | 4/2004 | Choi ........................... 349/43 |
| 6,995,394 B2 * | 2/2006 | Hong et al. .................. 257/59 |

FOREIGN PATENT DOCUMENTS

JP  55-99762  7/1980

* cited by examiner

*Primary Examiner*—Toan Ton
*Assistant Examiner*—Tai Duong
(74) *Attorney, Agent, or Firm*—MacPherson Kwok Chen & Heid LLP

(57) ABSTRACT

A thin film transistor array panel is provided, which includes: a gate wire formed on an insulating substrate; a data wire formed on the insulating substrate, insulated from the gate wire, and intersecting the gate wire; a storage electrode wire formed on the insulating substrate, insulated from the data wire, and intersecting the data wire; a plurality of pixel electrodes provided on the respective pixel areas defined by the intersections of the gate wire and the data wire, each pixel electrode having a cutout; a plurality of direction control electrodes provided on the respective pixel areas defined by the intersections of the gate wire and the data wire; a plurality of first thin film transistors connected to the gate wire, the data wire, and the pixel electrodes; and a plurality of second thin film transistors connected to the gate wire, the storage electrode wire, and the direction control electrodes.

19 Claims, 20 Drawing Sheets

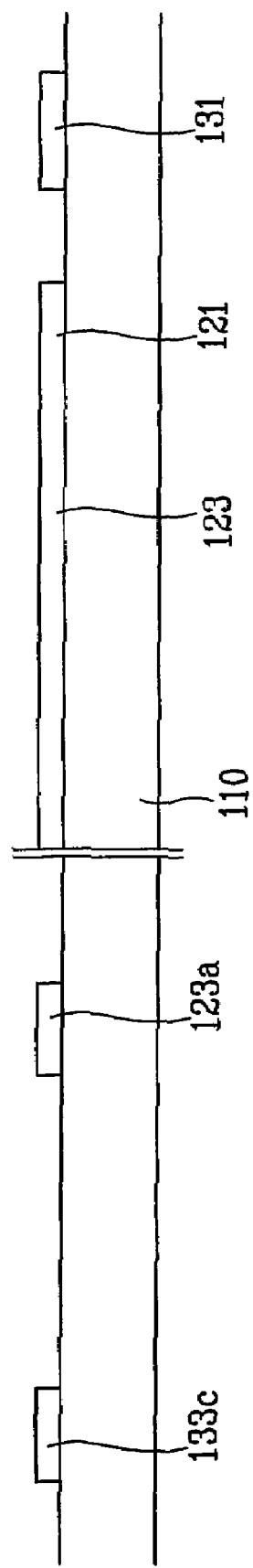

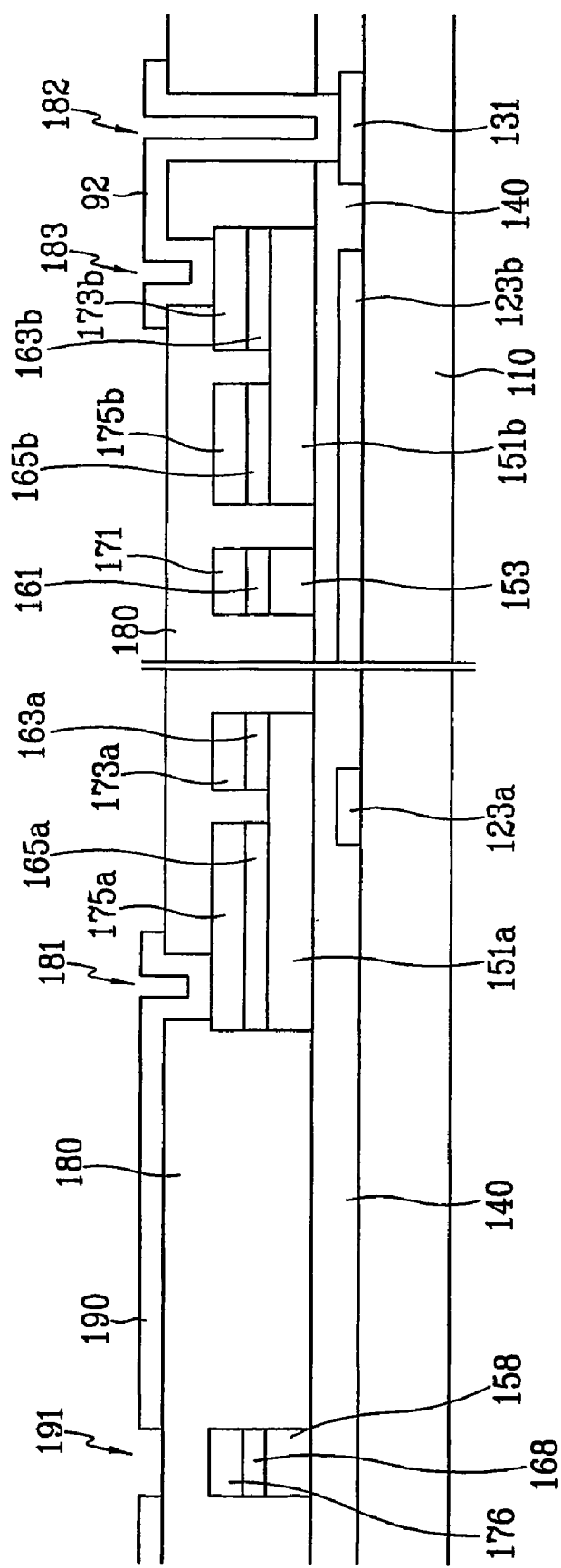

<Vcom DCE VA Mode>  <Cross DCE VA Mode>

MULTI-DOMAIN LIQUID CRYSTAL DISPLAY AND A THIN FILM TRANSISTOR SUBSTRATE OF THE SAME

BACKGROUND OF THE INVENTION (a) Field of the Invention

The present invention relates to a liquid crystal display, and in particular, vertically-aligned liquid crystal display having a pixel region including a plurality of domains for wide viewing angle.

(b) Description of the Related Art

A typical liquid crystal display (LCD) includes an upper panel provided with a common electrode and an array of color filters, a lower panel provided with a plurality of thin film transistors (TFTs) and a plurality of pixel electrodes, and a liquid crystal layer is interposed therebetween. The pixel electrodes and the common electrode are applied with electric voltages and the voltage difference therebetween causes electric field. The variation of the electric field changes the orientations of liquid crystal molecules in the liquid crystal layer and thus the transmittance of light passing through the liquid crystal layer. As a result, the LCD displays desired images by adjusting the voltage difference between the pixel electrodes and the common electrode.

The LCD has a major disadvantage of its narrow viewing angle, and several techniques for increasing the viewing angle have been developed. Among these techniques, the provision of a plurality of cutouts or a plurality of projections on the pixel electrodes and the common electrode opposite each other along with the vertical alignment of the liquid crystal molecules with respect to the upper and the lower panels is promising.

The cutouts provided both at the pixel electrodes and the common electrode give wide viewing angle by generating fringe field to adjust the tilt directions of the liquid crystal molecules.

The provision of the projections both on the pixel electrode and the common electrode distorts the electric field to adjust the tilt directions of the liquid crystal molecules.

The fringe field for adjusting the tilt directions of the liquid crystal molecules to form a plurality of domains is also obtained by providing the cutouts at the pixel electrodes on the lower panel and the projections on the common electrode on the upper panel.

Among these techniques for widening the viewing angle, the provision of the cutouts has problems that an additional mask for patterning the common electrode is required, an overcoat is required for preventing the effect of the pigments of the color filters on the liquid crystal material, and severe disclination is generated near the edges of the patterned electrode. The provision of the projections also has a problem that the manufacturing method is complicated since it is required an additional process step for forming the projections or a modification of a process step. Moreover, the aperture ratio is reduced due to the projections and the cutouts.

SUMMARY OF THE INVENTION

It is a motivation of the present invention to provide a liquid crystal display manufactured by simple process and ensuring stable multi-domains.

These and other motivation may be achieved by providing a pixel thin film transistor for a pixel electrode and a direction-control-electrode thin film transistor for a direction control electrode. The pixel thin film transistor transmits signals from a data line and the direction-control-electrode thin film transistor transmits signals from a storage electrode wire.

A thin film transistor array panel is provided, which includes: an insulating substrate; a plurality of first signal lines formed on the insulating substrate; a plurality of second signal lines formed on the insulating substrate, insulated from the first signal lines, and intersecting the first signal lines; a plurality of third signal lines formed on the insulating substrate, insulated from the second signal lines, and intersecting the second signal lines; a plurality of pixel electrodes provided on respective pixel areas defined by the intersections of the first and the second signal lines, each pixel electrode having a cutout; a plurality of direction control electrodes provided on the respective pixel areas defined by the intersections of the first and the second signal lines; a plurality of first thin film transistors, each first thin film transistor connected to one of the first signal lines, one of the second signal lines, and one of the pixel electrodes; and a plurality of second thin film transistors, each second thin film transistor connected to one of the first signal lines, one of the third signal lines, and one of the direction control electrodes.

Preferably, one of the first thin film transistors and one of the second thin film transistor located on one of the pixel areas are connected to a relevant one of the first signal lines and a previous one of the first signal lines.

A thin film transistor array panel is provided, which includes: an insulating substrate; a gate wire formed on the insulating substrate and including first and second gate electrodes and a plurality of gate lines; a storage electrode wire formed on the insulating substrate and including a plurality of storage electrode lines and a plurality of storage electrodes; a gate insulating layer formed on the gate wire and the storage electrode wire; a semiconductor layer formed on the gate insulating layer; a data wire formed on the semiconductor layer and including a plurality of data lines intersecting the gate lines, a plurality of first source electrodes connected to the data lines, a plurality of first drain electrodes opposite the first source electrodes with respect to the first gate electrodes, a plurality of second source electrodes electrically connected to the storage electrode wire, and a plurality of second drain electrodes opposite the second source electrodes with respect to the second gate electrodes; a direction control electrode connected to the second drain electrode; a passivation layer formed on the data wire and the direction control electrode and having a plurality of contact holes; and a pixel electrode formed on the passivation layer, having a plurality of cutouts, and electrically connected to the first drain electrodes through the contact holes.

The direction control electrode overlaps the cutouts of the pixel electrode at least in part. The cutouts of the pixel electrode may have a plurality of X-shaped cutouts and a plurality of rectilinear cutouts and the direction control electrode preferably overlaps the X-shaped cutouts. The semiconductor layer preferably includes a plurality of data portions disposed under the data lines, a plurality of first channel portions disposed under the first source electrodes and the first drain electrodes, and a plurality of second channel portions disposed under the second source electrodes and the second drain electrodes. The thin film transistor array panel may further include a plurality of connecting members formed on the passivation layer and connecting the second source electrodes and the storage electrode wire through contact holes provided at the passivation layer and the gate insulating layer. The direction control electrode preferably includes substantially the same layer and material as the data wire.

A liquid crystal display is provided, which includes: a first insulating substrate; a plurality of first signal lines formed on the first insulating substrate; a plurality of second signal lines formed on the first insulating substrate, insulated from the first signal lines, and intersecting the first signal lines; a plurality of third signal lines formed on the first insulating substrate, insulated from the second signal lines, and intersecting the second signal lines; a plurality of pixel electrodes provided on the respective pixel areas defined by the intersections of the first and the second signal lines, each pixel electrode having a cutout; a plurality of direction control electrodes provided on the respective pixel areas defined by the intersections of the first and the second signal lines; a plurality of switching elements, each first switching element connected to one of the first signal lines, one of the second signal lines, and one of the pixel electrodes; a plurality of second thin film transistors, each second switching element connected to one of the first signal lines, one of the third signal lines, and one of the direction control electrodes; a second insulating substrate opposite the first insulting substrate; a common electrode formed on the second insulating substrate; and a liquid crystal layer interposed between the first insulating substrate and the second insulating substrate.

The third signal lines are preferably supplied with a voltage to be applied to the common electrode. The liquid crystal layer has negative dielectric anisotropy and major axes of liquid crystal molecules in the liquid crystal layer are aligned vertical to the first and the second substrates. Otherwise, the liquid crystal layer has positive dielectric anisotropy and major axes of liquid crystal molecules in the liquid crystal layer are aligned parallel to the first and the second substrates.

A thin film transistor array panel is provided, which includes: an insulating substrate; a gate wire formed on the insulating substrate; a storage electrode wire formed on the insulating substrate; a gate insulating layer formed on the gate wire and the storage electrode wire; a data wire formed on the gate insulating layer including three layers an amorphous silicon layer, a doped amorphous silicon layer, and a metal layer; a direction control electrode formed on the gate insulating layer, including three layers an amorphous silicon layer, a doped amorphous silicon layer, and a metal layer, and electrically connected to the second drain electrode; a passivation layer formed on the data wire and the direction control electrode and having a plurality of contact holes; and a pixel electrode formed on the passivation layer, having a plurality of cutouts, and electrically connected to the data wire through the contact holes.

It is preferable that the gate wire comprises first and second gate electrodes, the data wire comprises first and second source electrodes and first and second drain electrodes, the direction control electrode is connected to the second drain electrode, the pixel electrode is connected to the first drain electrode, and the second source electrode is connected to the storage electrode wire. The thin film transistor array panel may include a connecting member formed on the passivation layer and connecting the second source electrode and the storage electrode wire through a contact hole provided at the passivation layer and the gate insulating layer.

A method of manufacturing a thin film transistor array panel is provided, which includes: forming a gate wire and a storage electrode wire; depositing a gate insulating layer, an amorphous silicon layer, a contact layer, and a metal conductive layer; patterning the amorphous silicon layer, the contact layer, and the metal conductive layer to form a data wire, a direction control electrode, and a channel portion of a thin film transistor; forming a passivation layer on the channel portion; and forming a pixel electrode and a connecting portion on the passivation layer.

BRIEF DESCRIPTION OF THE DRAWINGS

FIGS. 3A to 3D are sectional views of a TFT array panel for an LCD sequentially illustrating a manufacturing method thereof according to a first embodiment of the present invention;

FIG. 5 is a sectional view of the TFT array panel shown in FIG. 4 taken along the lines V-V' and V'-V";

DETAILED DESCRIPTION OF PREFERRED EMBODIMENTS

Figure 1:
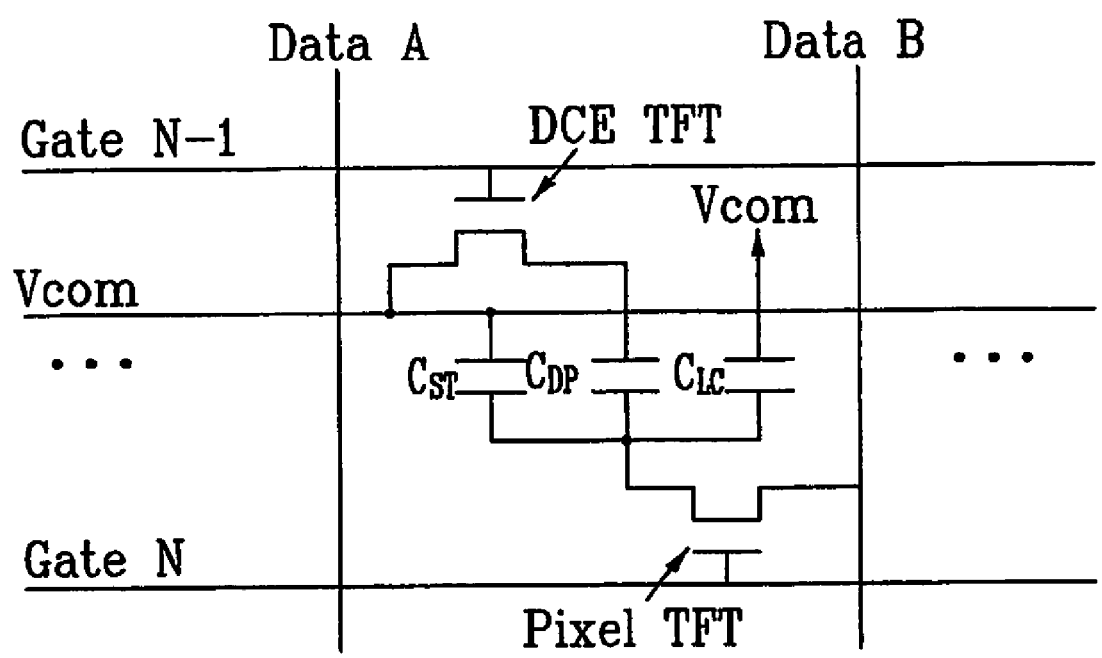
FIG. 1 is an equivalent circuit diagram of an LCD according to an embodiment of the present invention.

The present invention now will be described more fully hereinafter with reference to the accompanying drawings, in which preferred embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs according to embodiments of this invention will be described in detail with reference to the accompanying drawings.

FIG. 1 is an equivalent circuit diagram of an LCD according to an embodiment of the present invention.

An LCD according to an embodiment of the present invention includes a TFT array panel, a color filter array panel opposite the TFT array panel, and a liquid crystal layer interposed therebetween. The TFT array panel is provided with a plurality of gate lines and a plurality of data lines intersecting each other to define a plurality of pixel areas, and a plurality of storage electrode lines extending parallel to the gate lines. The gate lines transmit scanning signals and the data lines transmit image signals. A common voltage Vcom is applied to the storage electrode lines. Each pixel area is provided with a pixel TFT for a pixel electrode and a direction-control-electrode TFT DCETFT for a direction control electrode ("DCE"). Tie pixel TFT includes a gate electrode connected to one of the gate lines, a source electrode connected to one of the data lines, and a drain electrode connected to one of a plurality of pixel electrodes, while the DCE TFT includes a gate electrode connected to a previous gate line, a source electrode connected to one of the storage electrode lines, and a drain electrode connected to one of a plurality of direction control electrodes.

The DCE and the pixel electrode are capacitively coupled, and the capacitor therebetween or its capacitance is represented by $C_{DP}$. The pixel electrode and a common electrode provided on the color filter array panel form a liquid crystal capacitor, and the liquid crystal capacitor or its capacitance is represented by $C_{LC}$. The pixel electrode and a storage electrode connected to one of the storage electrode lines form a storage capacitor, and the storage capacitor or its capacitance is represented by $C_{ST}$.

Although it is not shown in the circuit diagram, the pixel electrode according to an embodiment of the present invention has an aperture overlapping the DCE such that the electric field due to the DCE flows out through the aperture. The electric field flowing out through the aperture makes the liquid crystal molecules have pretilt angles. The pretilted liquid crystal molecules are rapidly aligned without dispersion along predetermined directions upon the application of the electric field due to the pixel electrode.

In order to obtain the pretilted liquid crystal molecules using the electric field generated by the DCE, the potential of the DCE relative to the potential of the common electrode (referred to as the "DCE voltage" hereinafter) is larger than the potential of the pixel electrode relative to the potential of the common electrode (referred to as the "pixel voltage" hereinafter) by a predetermined value. The LCD according to an embodiment of the present invention easily satisfies this requirement by isolating the DCE after applying the potential applied to the storage electrode lines to the DCE. The reason will be described now.

Consider a moment that a given pixel electrode having a negative potential is refreshed by a positive potential. The application of a gate-on signal to the previous gate line turns on the DCE TFT to make the DCE have a potential higher than the pixel electrode. This changes the potential of the pixel electrode capacitively coupled with the DCE. In this case, the capacitor $C_{DP}$ between the DCE and the pixel electrode and the capacitor $C_{LC}$ between the pixel electrode and the common electrode are connected in series. Since the pixel electrode had the negative potential, its potential is lower than that of the DCE, i.e., $V_{DCE} > V_P$ during the charging of the serially-connected capacitors $C_{DP}$ and $C_{LC}$. When the DCE TFT is turned off after charging, the DCE floats. Accordingly, the potential of the DCE is always larger than the potential of the pixel electrode irrespective of the potential change of the pixel electrode. For example, when the potential of the pixel electrode is increased to a positive value when the pixel TFT is turned on, the potential of the DCE follows the potential increase of the pixel electrode in order to maintain the potential difference between the DCE and the pixel electrode.

This is described in terms of an electrical circuit.

A voltage across a capacitor in an electrical circuit is given by:

$$V_C = V_0 + \frac{1}{C} \int_0^t i\, d(t) \quad (1)$$

A floating electrode is equivalent to an electrode connected to a resistor having infinite resistance (R=∞). Therefore, i=0 and V_c=V_0, that is, the initial voltage across the capacitor is maintained. In other words, the potential of a floating electrode increases or decreases coupled with the potential of the other electrode.

On the contrary, when refreshing with a negative potential, the potential of the DCE is always lower than the potential of the pixel electrode by a predetermined value.

According to an embodiment of the present invention, the DCE TFT is connected to the storage electrode lines such that the common voltage is applied to the DCE. Hence, the potentials of the two electrodes increases or decreases to have substantially the same polarity irrespective of the polarity of the potential applied to the pixel electrode in the next frame. As a result, the present invention is applied any inversion type such as line inversion and dot inversion.

For the same gray, there is no variation of the potential difference between the DCE and the pixel electrode irrespective of the grays of previous and next frames, thereby ensuring stability of image quality.

The disconnection of the DCE TFTs from the data lines prevents the increase of the load of the data lines.

Now, a detailed embodiment of the present invention is described with reference to FIGS. 2A to 2C.

Figure 2A:
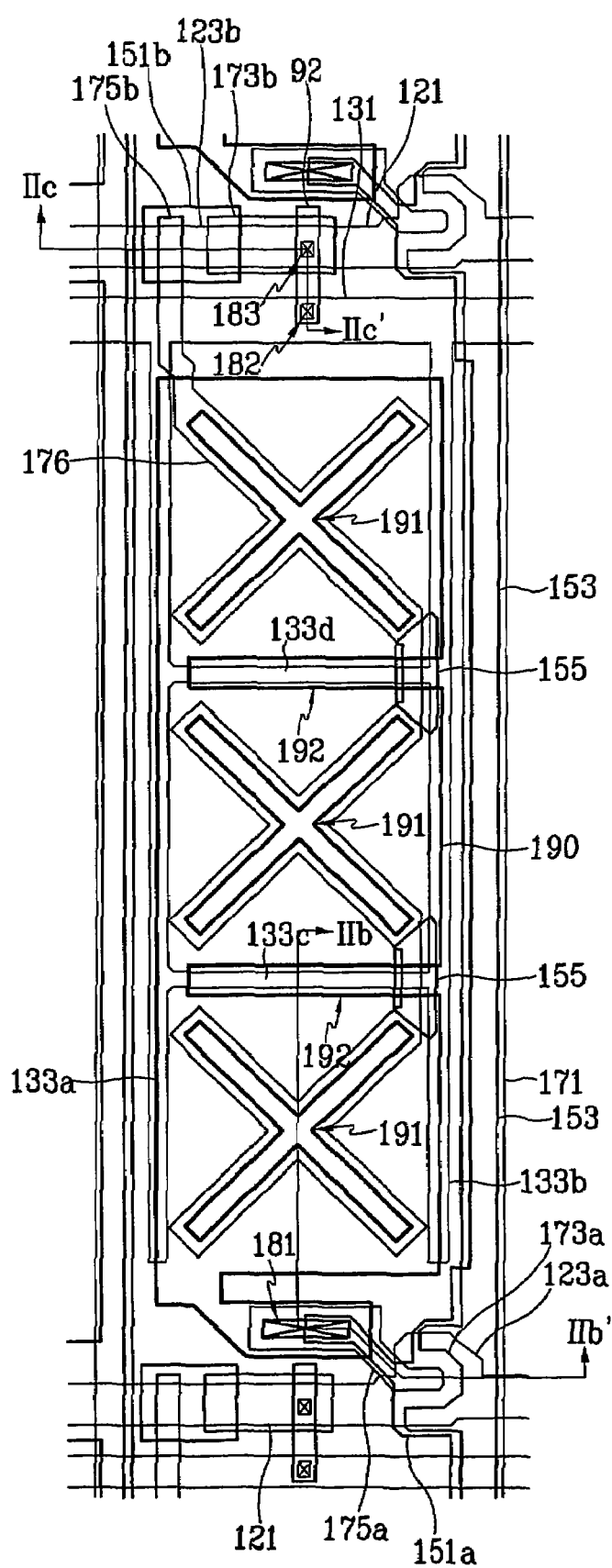
FIG. 2A is a layout view of a TFT array panel for an LCD according to a first embodiment of the present invention.
Figure 2B:
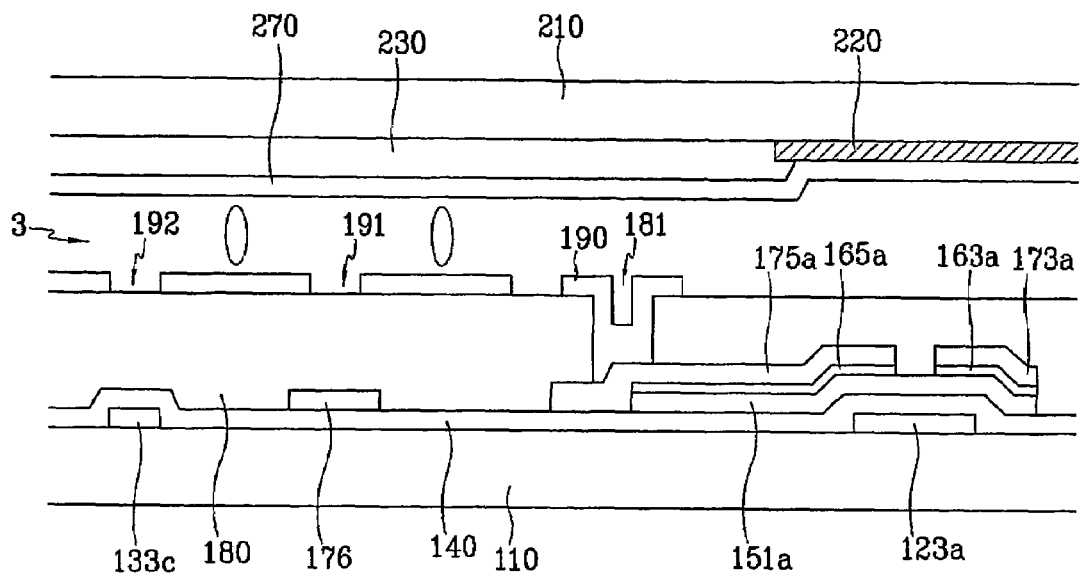
FIGS. 2B and 2C are sectional views of the TFT array panel shown in FIG. 2A taken along the lines IIb-IIb' and IIc-IIc', respectively.
Figure 2C:
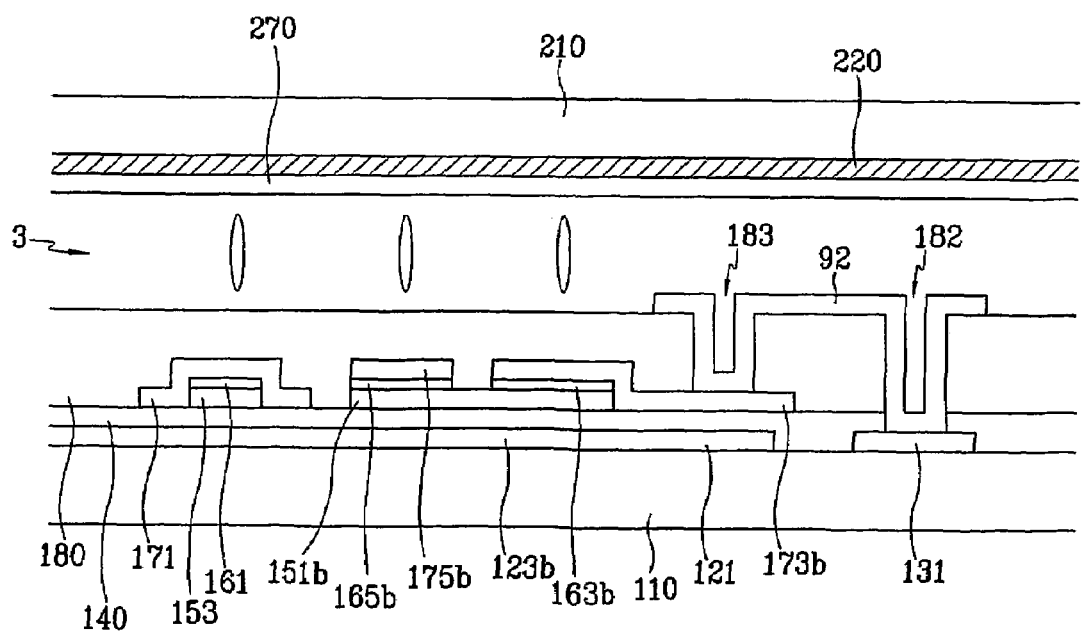

FIG. 2A is a layout view of an LCD according to an embodiment of the present invention, and FIGS. 2B and 2C are sectional views of the LCD shown in FIG. 2A taken along the lines IIB-IIB'.

An LCD according to a first embodiment of the present invention includes a lower panel, an upper panel facing the lower panel, and a vertically (or homeotropically) aligned liquid crystal layer interposed between the lower panel and the upper panel.

The lower panel will now be described more in detail.

A plurality of gate lines 121 are formed on an insulating substrate 110 and a plurality of data lines 171 are formed thereon. The gate lines 121 and the data lines 171 are insulated from each other and intersect each other to define a plurality of pixel areas.

Each pixel area is provided with a pixel TFT, a DCE TFT, a DCE and a pixel electrode. The pixel TFT has three terminals, a first gate electrode 123a, a first source electrode 173a and a first drain electrode 175a while the DCE TFT has three terminals, a second gate electrode 123b, a second source electrode 173b and a second drain electrode 175b. The pixel TFT is provided for switching the signals transmitted to the pixel electrode 190 while the DCE TFT is provided for switching the signals entering the DCE 176. The gate electrode 123a, the source electrode 173a and the drain electrode 175 of the pixel TFT are connected to corresponding one of the gate lines 121, one of the data lines 171 and the pixel electrode 190, respectively. The gate electrode 123b, the source electrode 173b and the drain electrode 175b of the DCE TFT are connected to previous one of the gate lines 121, corresponding one of the storage electrode lines 131 and the DCE 176, respectively. The DCE 176 is applied with a direction-controlling voltage for controlling the pre-tilts of the liquid crystal molecules to generate a direction-controlling electric field between the DCE 176 and the common electrode 270. The DCE 176 is formed in a step for forming the data lines 171.

The layered structure of the lower panel will be described in detail.

A plurality of gate lines 121 extending substantially in a transverse direction are formed on an insulating substrate 110, and a plurality of first and second gate electrodes 123a and 123b are connected to the gate lines 121. A plurality of storage electrode lines 131 and a plurality of sets of first to fourth storage electrodes 133a-133d are also formed on the insulating substrate 110. The storage electrode lines 131 extend substantially in the transverse direction, and the first and the second storage electrodes 133a and 133b extend from the storage electrode line 131 in a longitudinal direction. The third and the fourth storage electrodes 133c and 133d extend in the transverse direction and connect the first storage electrode 133a and the second storage electrode 133b.

The gate wire 121, 123a and 123b and the storage electrode wire 131 and 133a-133d are preferably made of Al, Cr or their alloys, Mo or Mo alloy. If necessary, the gate wire 121, 123a and 123b and the storage electrode wire 131 and 133a-133d include a first layer preferably made of Cr or Mo alloys having excellent physical and chemical characteristics and a second layer preferably made of Al or Ag alloys having low resistivity.

A gate insulating layer 140 is formed on the gate wire 121, 123a and 123b and the storage electrode wire 131 and 133a-133d.

A semiconductor layer 151a, 151b, 153 and 155 preferably made of amorphous silicon is formed on the gate insulating layer 140. The semiconductor layer 151a, 151b, 153 and 155 includes a plurality of first and second channel semiconductors 151a and 151b forming channels of TFTs, a plurality of data-line semiconductors 153 located under the data lines 171, and a plurality of intersection semiconductors 155 located near the intersections of DCEs 176 and the storage electrodes 133c and 133d for ensuring insulation therebetween.

An ohmic contact layer 161, 163a, 163b, 165a and 165b preferably made of silicide or n+ hydrogenated amorphous silicon heavily doped with n type impurity is formed on the semiconductor layer 151a, 151b, 153 and 155.

A data wire 171, 173a, 173b, 175a and 175b is formed on the ohmic contact layer 161, 163a, 163b, 165a and 165b and the gate insulating layer 140. The data wire 171, 173a, 173b, 175a and 175b includes a plurality of data lines 171 extending in the longitudinal direction and intersecting the gate lines 121 to form a plurality of pixels, a plurality of first source electrodes 173a branched from the data lines 171 and extending onto portions 163a of the ohmic contact layer, a plurality of first drain electrodes 175a disposed on portions 165a of the ohmic contact layer, located opposite the first source electrodes 173a with respect to the first gate electrodes 123a and separated from the first source electrodes 173a, a plurality of second source electrodes 173b and a plurality of second drain electrodes 175b disposed on respective portions 163b and 165b opposite each other with respect to the second gate electrodes 123b, and a plurality of data pads (not shown) connected to one ends of the data lines 171 to receive image signals from an external device.

A plurality of DCEs 176 are formed in the pixel areas defined by the intersections of the gate lines 121 and the data lines 171. Each DCE 176 includes a plurality of X-shaped metal pieces connected to one another and is connected to the second drain electrode 175b. The data wire 171, 173a, 173b, 175a and 175b and the DCEs 176 are preferably made of Al, Cr or their alloys, Mo or Mo alloy. If necessary, the data wire 171, 173a, 173b, 175a and 175b and the DCEs 176 include a first layer preferably made of Cr or Mo alloys having excellent physical and chemical characteristics and a second layer preferably made of Al or Ag alloys having low resistivity.

A passivation layer 180 preferably made of silicon nitride or organic insulator is formed on the data wire 171, 173a, 173b, 175a and 175b.

The passivation layer 180 is provided with a plurality of contact holes 181 exposing the first drain electrodes 175a, a plurality of contact holes 182 extending to the gate insulating layer 140 and exposing the storage electrode lines 131, a plurality of contact holes 183 exposing the second source electrodes 173b, a plurality of contact holes (not shown) exposing the data pads, and a plurality of contact holes (not shown) extending to the gate insulating layer 140 exposing the gate pads. The contact holes exposing the pads may have various shapes such as polygon or circle. The area of the contact hole is preferably equal to or larger than 0.5 mm×15 μm and not larger than 2 mm×60 μm.

A plurality of pixel electrodes 190 are formed on the passivation layer 180. Each pixel electrode 190 is connected to the first drain electrode 175a through the contact hole 181 and has a plurality of X-shaped cutouts 191 and a plurality of linear cutouts 192. The X-shaped cutouts 191 overlap the X-shaped portions of the DCE 176 while the linear cutouts 192 overlap the third and the fourth storage electrodes 133c and 133d. The DCE 176 broadly overlaps peripheries of the cutouts 191 as well as the cutouts 191 themselves to form a storage capacitance along with the pixel electrode 190.

A plurality of bridges 92 connecting the storage electrode lines 131 and the second source electrodes 173b through the contact holes 182 and 183 are also formed on the passivation layer. Furthermore, a plurality of subsidiary gate pads (not shown) and a plurality of subsidiary data pads (not shown) are formed on the passivation layer 180. The subsidiary gate pads and the subsidiary data pads are connected to the gate pads and the data pads through the contact holes. The pixel electrodes 190, the bridges 92, the subsidiary gate pads and the subsidiary data pads are preferably formed of indium zinc oxide ("IZO"). Alternatively, the pixel electrodes 190, the bridges 92 and the subsidiary pads are preferably made of indium tin oxide ("ITO").

To summarize, each pixel electrode 190 has the plurality of cutouts 191 and 192 for partitioning a pixel region into a plurality of domains, and the first cutouts 191 overlap the DCE 176 while the second cutouts 192 overlap the storage electrodes 133c and 133d. The DCE 176 and the first cutouts 191 are aligned such that the DCE 176 is exposed through the first cutouts 191 to be seen in front view. The storage electrode line 131 and the DCE 176 are connected via the DCE TFT while the data line 171 and the pixel electrode 190 are connected via the pixel TFT, and the pixel electrode 190 and the DCE 176 are aligned to form a storage capacitance.

According to another embodiment of the present invention, the DCEs 176 include substantially the same layer as the gate wire 121, 123a and 123b. The portions of the passivation layer 180 on the DCEs 176 may be removed to form a plurality of openings.

The upper substrate 210 will now be described in detail.

A black matrix 220 for preventing light leakage, a plurality of red, green and blue color filters 230, and a common electrode 270 preferably made of a transparent conductor such as ITO or IZO are formed on an upper substrate 210 preferably made of transparent insulating material such glass.

A plurality of liquid crystal molecules contained in the liquid crystal layer 3 is aligned such that their director is perpendicular to the lower and the upper substrates 110 and 210 in absence of electric field. The liquid crystal layer 3 has negative dielectric anisotropy.

The lower substrate 110 and the upper substrate 210 are aligned such that the pixel electrodes 190 exactly match and overlap the color filters 230. In this way, a pixel region is divided into a plurality of domains by the cutouts 191 and 192. The alignment of the liquid crystal layer 3 in each domain is stabilized by the DCE 176.

This embodiment illustrates the liquid crystal layer 3 having negative dielectric anisotropy and homeotropic alignment with respect to the substrates 110 and 210. However, the liquid crystal layer 3 may have positive dielectric anisotropy and homogeneous alignment with respect to the substrates 110 and 210.

A method of manufacturing a TFT array panel of an LCD having the above-described structure will be described.

FIGS. 3A to 3D are sectional views of a TFT array panel for an LCD sequentially illustrating a manufacturing method thereof according to a first embodiment of the present invention.

First, as shown in FIG. 3A, a conductive layer preferably made of metal is deposited by sputtering and either dry-etched or wet-etched by a first photo-etching step using a mask to form a gate wire and a storage electrode wire on a substrate 110. The gate wire includes a plurality of gate lines 121, a plurality of gate pads (not shown) and a plurality of gate electrodes 123, and the storage wire includes a plurality of storage electrode lines 131 and a plurality of storage electrodes 133a-133d.

Figure 3B:
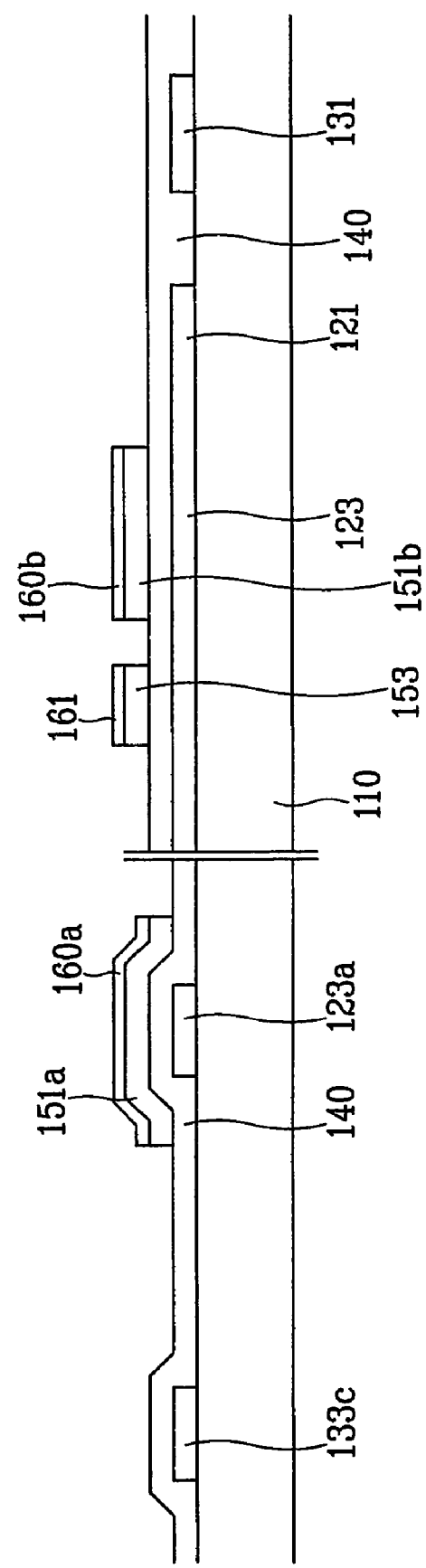

As shown in FIG. 3B, a gate insulating layer 140 with 1,500-5,000 Å thickness, a hydrogenated amorphous silicon layer with 500-2,000 Å thickness, and a doped amorphous silicon layer with 300-600 Å thickness are sequentially deposited by chemical vapor deposition ("CVD"). The doped amorphous silicon layer and the amorphous silicon layer are patterned by a photo-etching step using a mask to form an ohmic contact layer 160a, 160b and 161 and an amorphous silicon layer 151a, 151b and 153.

Figure 3C:
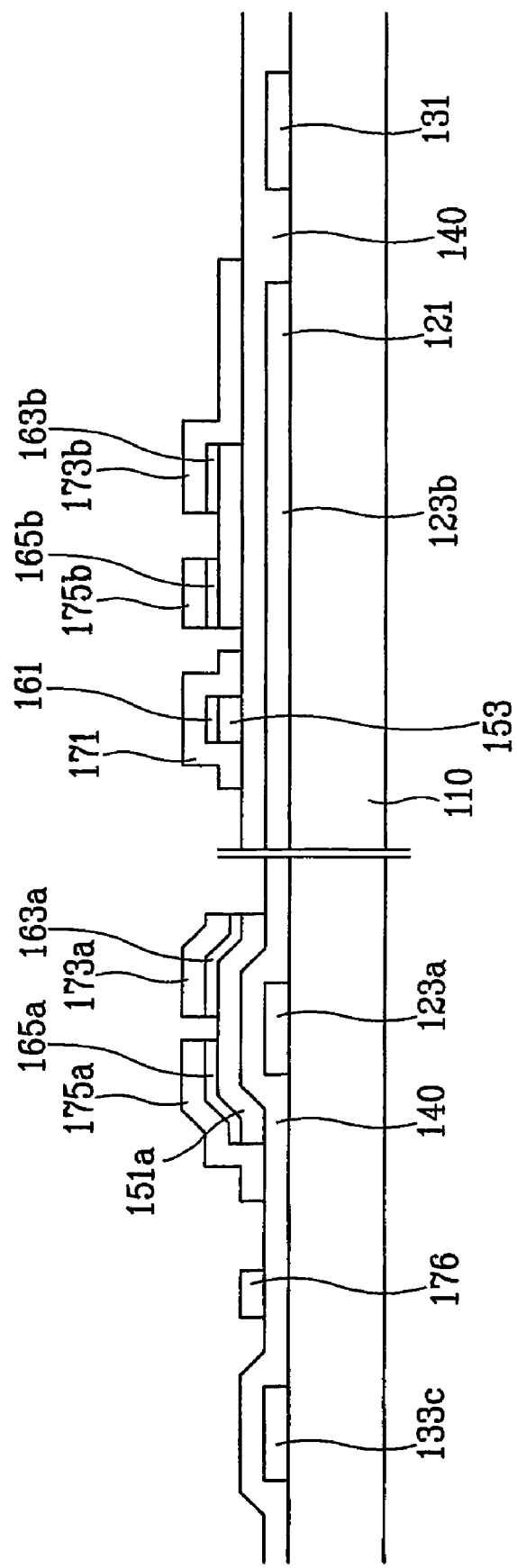

Thereafter, as shown in FIG. 3C, a conductive layer with 1,500-3,000 Å thickness preferably made of metal is deposited by sputtering and patterned by a photo-etching step using a mask to form a data wire and a plurality of DCEs 176. The data wire includes a plurality of data lines 171, a plurality of source electrodes 173a and 173b, a plurality of drain electrodes 175a and 175b, and a plurality of data pads (not shown).

Then, portions of the ohmic contact layer 160a and 160b, which are not covered by the source electrodes 173a and 173b and the drain electrodes 175a and 175b, are removed such that an ohmic contact layer 163a, 163b, 165a and 165b including a plurality of separated portions is formed and portions of the semiconductor layer 153 between the source electrodes 173a and 173b and the drain electrodes 175a and 175b are exposed.

Figure 3D:
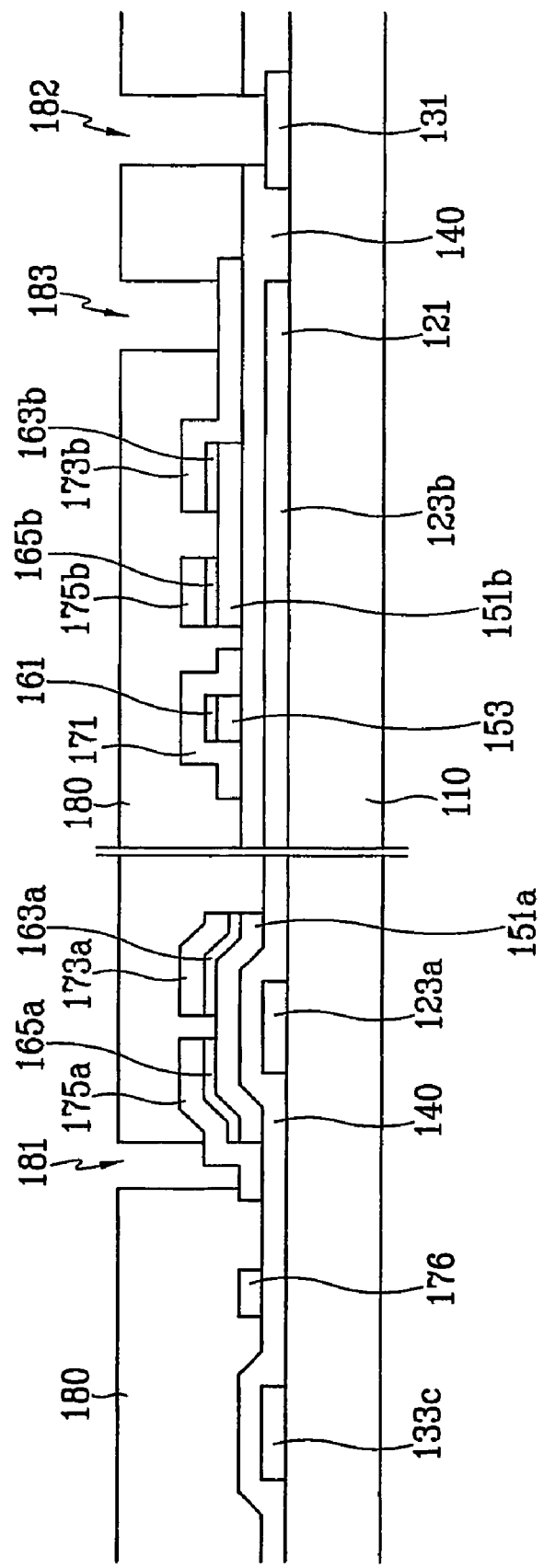

As shown in FIG. 3D, a passivation layer 180 is formed by coating an organic insulating material having low dielectric constant and good planarization characteristic or by CVD of low dielectric insulating material such as SiOF or SiOC having a dielectric constant equal to or less than 4.0. The passivation layer 180 together with the gate insulating layer 140 is patterned by a photo-etching step using a mask to form a plurality of contact holes 181, 182 and 183.

Finally, as shown in FIG. 2A, an ITO layer or an IZO layer with thickness of 1500-500 Å is deposited and photo-etched using a mask to form a plurality of pixel electrodes 190, a plurality of connecting bridges 92, a plurality of subsidiary gate pads (not shown) and a plurality of subsidiary data pads (not shown).

This technique is applied to a manufacturing method using five masks as described above. However, the technique may be well adapted for a method of a TFT array panel for an LCD using four masks. It is described in detail with reference to the drawings.

Figure 4:
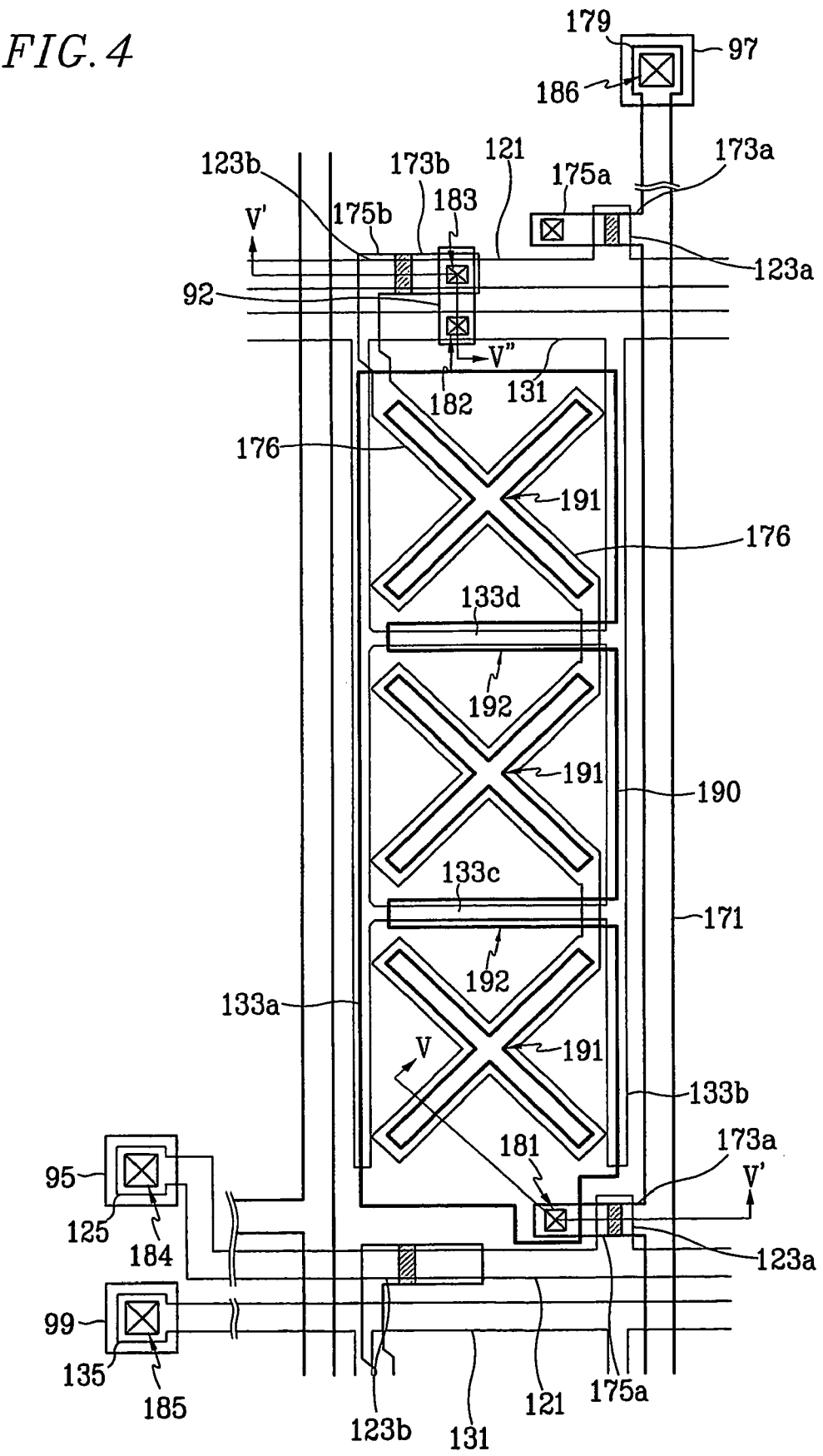
FIG. 4 is a layout view of a TFT array panel for an LCD according to a second embodiment of the present invention.

FIG. 4 is a layout view of a TFT array panel for an LCD according to a second embodiment of the present invention, and FIG. 5 is a sectional view of the TFT array panel shown FIG. 4 taken along the lines V-V' and V'-V".

A TFT array panel for an LCD according to a second embodiment of the present invention is manufactured by using four masks and has a feature compared with a TFT array panel manufactured by using five masks, which will be described now.

An ohmic contact layer 161, 163a, 163b, 165a, 165b and 168 formed under a plurality of DCEs 176 and a data wire including a plurality of data lines 171, a plurality of source electrodes 173a and 173b, a plurality of the drain electrodes 175a and 175b, and a plurality of data pads 179 has substantially the same shape as the data wire 171, 173a, 173b, 175a, 175b and 179 and the DCEs 176. An amorphous silicon layer 151a, 151b, 153 and 158 has substantially the same shape as the data wire and the DCEs 176 except that channel portions between the source electrodes 173a and 173b and the drain electrodes 175a and 175b are connected. Remaining structure is substantially the same as a TFT array panel manufactured by a five-mask process.

FIG. 4 illustrates a gate pad 125, a storage pad 135 and a data pad 179 as well as a subsidiary gate pad 95, a subsidiary storage pad 99 and a subsidiary data pad 97.

A method of manufacturing a TFT array panel will be now described.

FIGS. 6A to 11B are layout views and sectional views of a TFT array panel for an LCD sequentially illustrating a manufacturing method thereof.

Figure 6A:
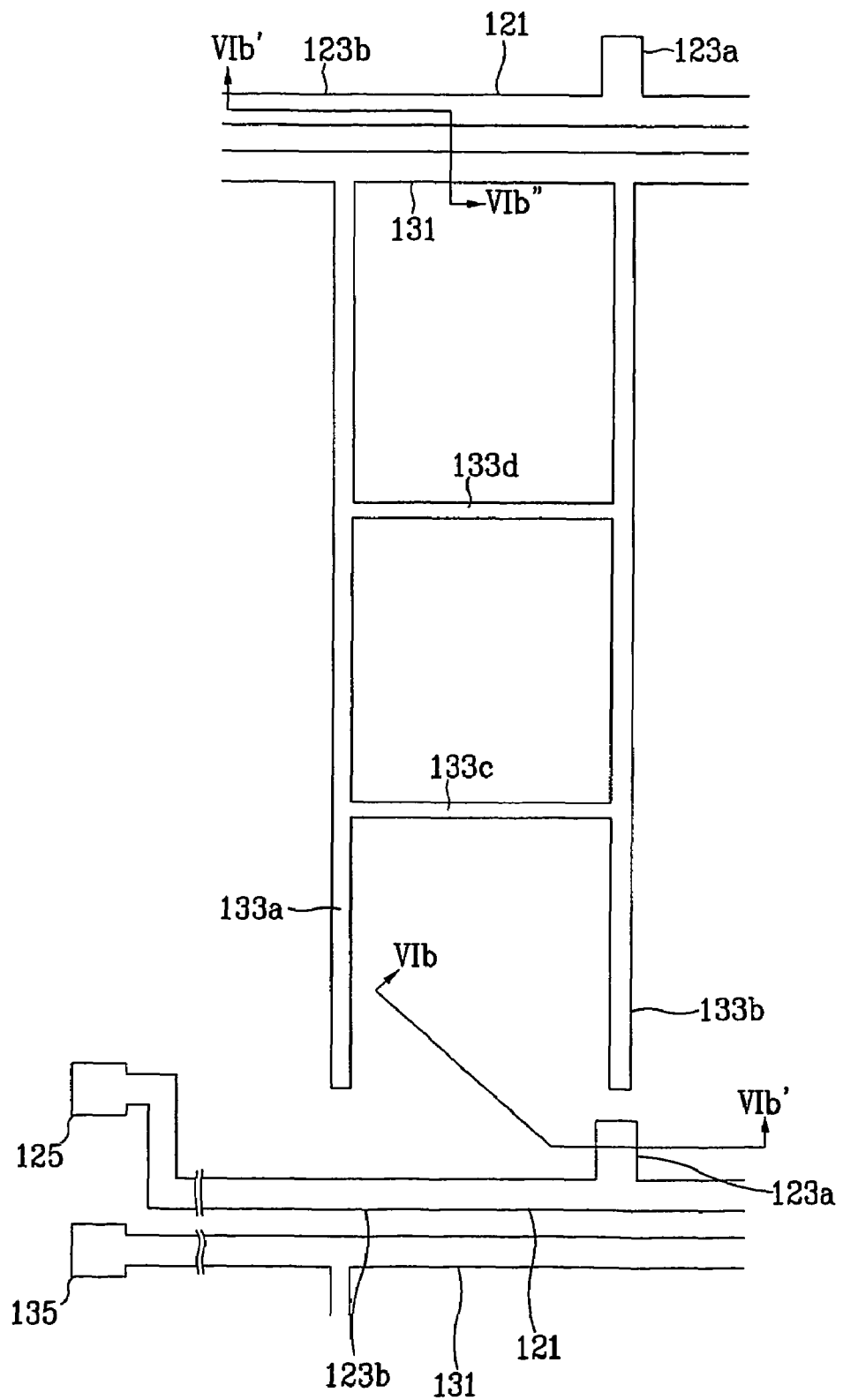
FIGS. 6A to 11B are layout views and sectional views of a TFT array panel for an LCD sequentially illustrating a manufacturing method thereof according to a second embodiment of the present invention.
Figure 6B:
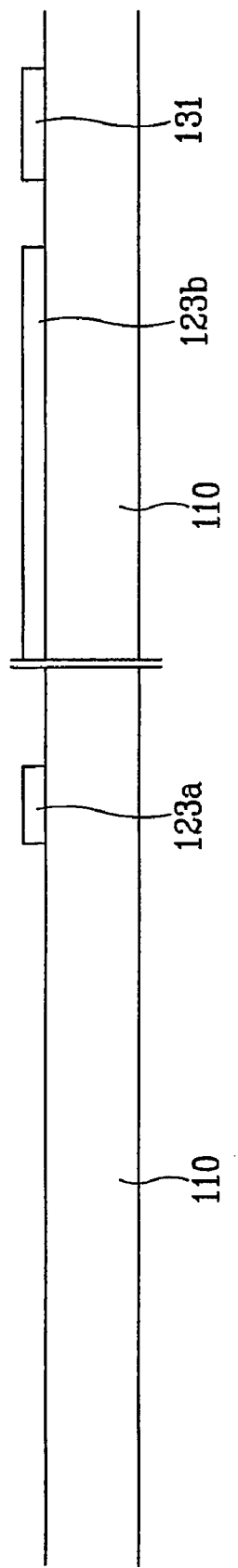

First, as shown in FIGS. 6A and 6B, Al, Ag, their alloys or the like is deposited and photo-etched to form a gate wire including a plurality of gate lines 121, a plurality of gate pads 125 and a plurality of gate electrodes 123, and a storage electrode wire 131 and 133a-133d. (First Mask)

Figure 7:
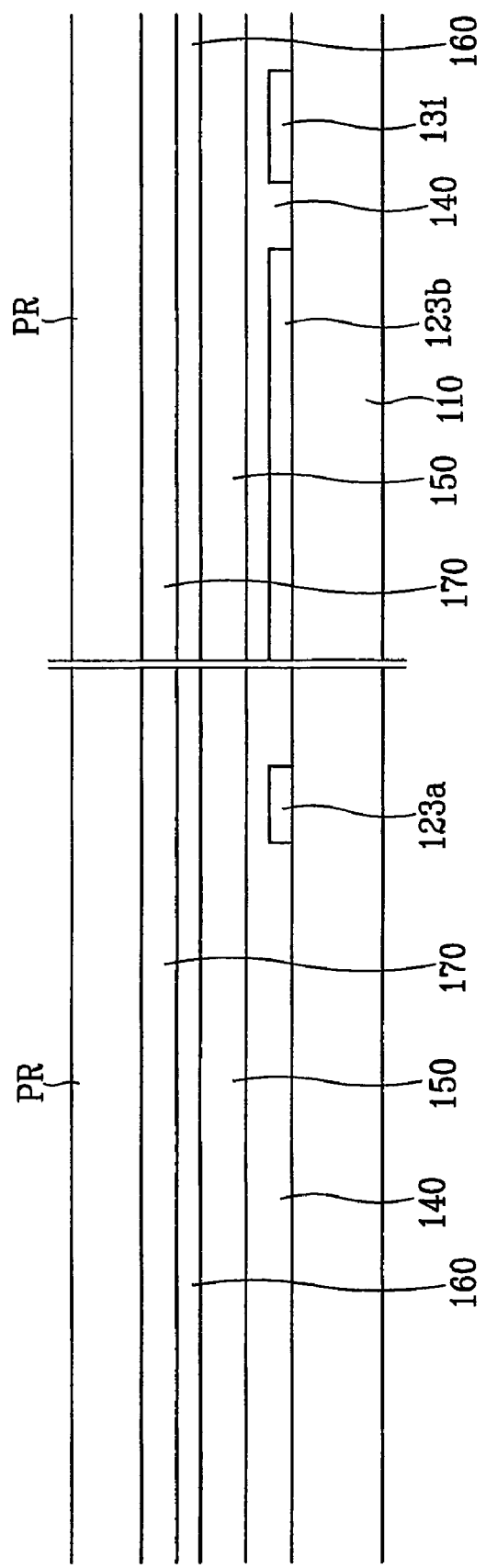

As shown in FIG. 7, a silicon nitride gate insulating layer 140 with 1,500-5,000 Å thickness, an amorphous silicon layer 150 with 500-2,000 Å thickness, and a contact layer 160 with 300-600 Å thickness are sequentially deposited by CVD. A conductive layer 170 preferably made of Al, Ag or their alloys is deposited by preferably sputtering, and a photoresist film PR with thickness of 1-2 microns is coated thereon.

Figure 8A:
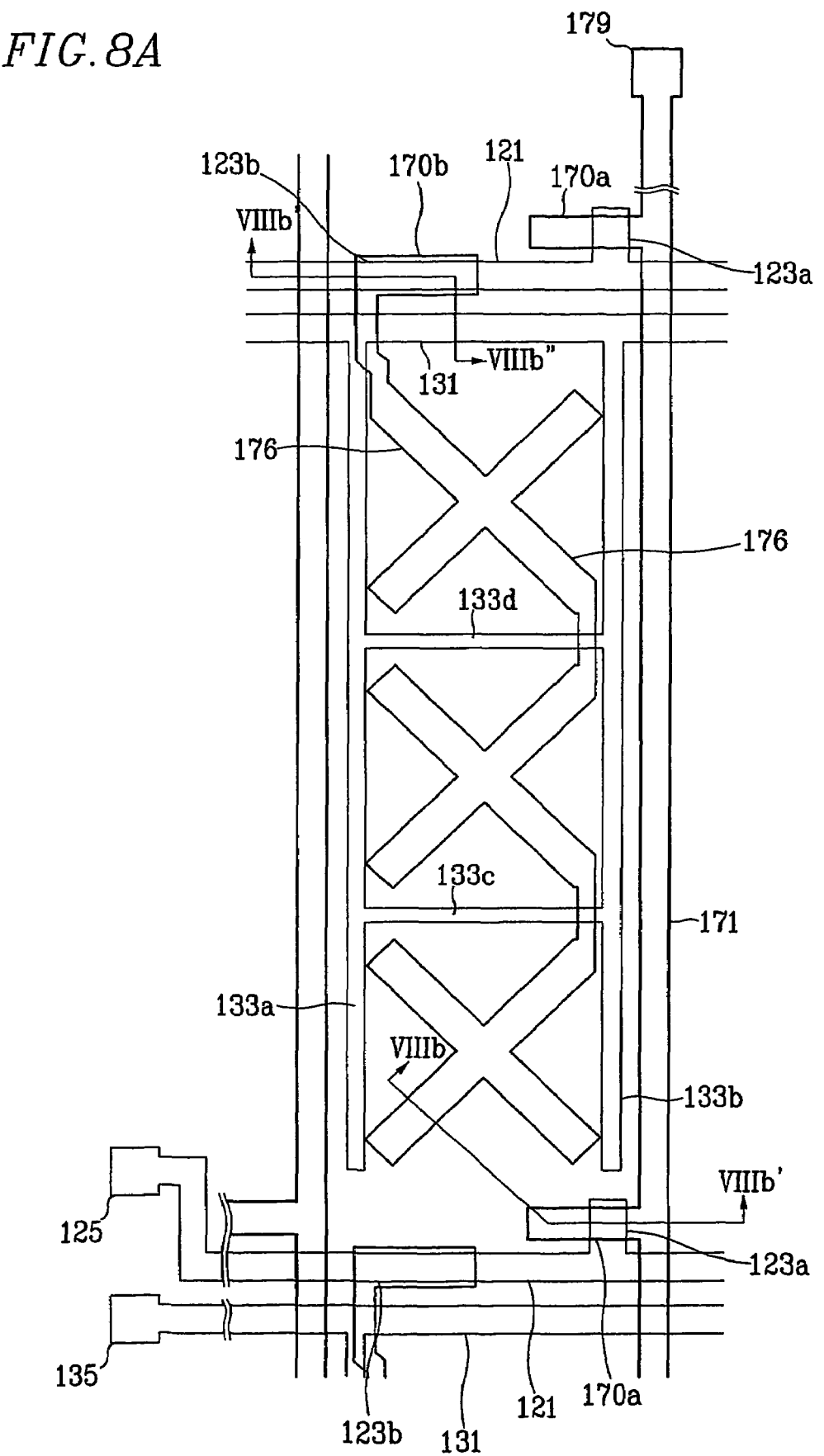
Figure 8B:
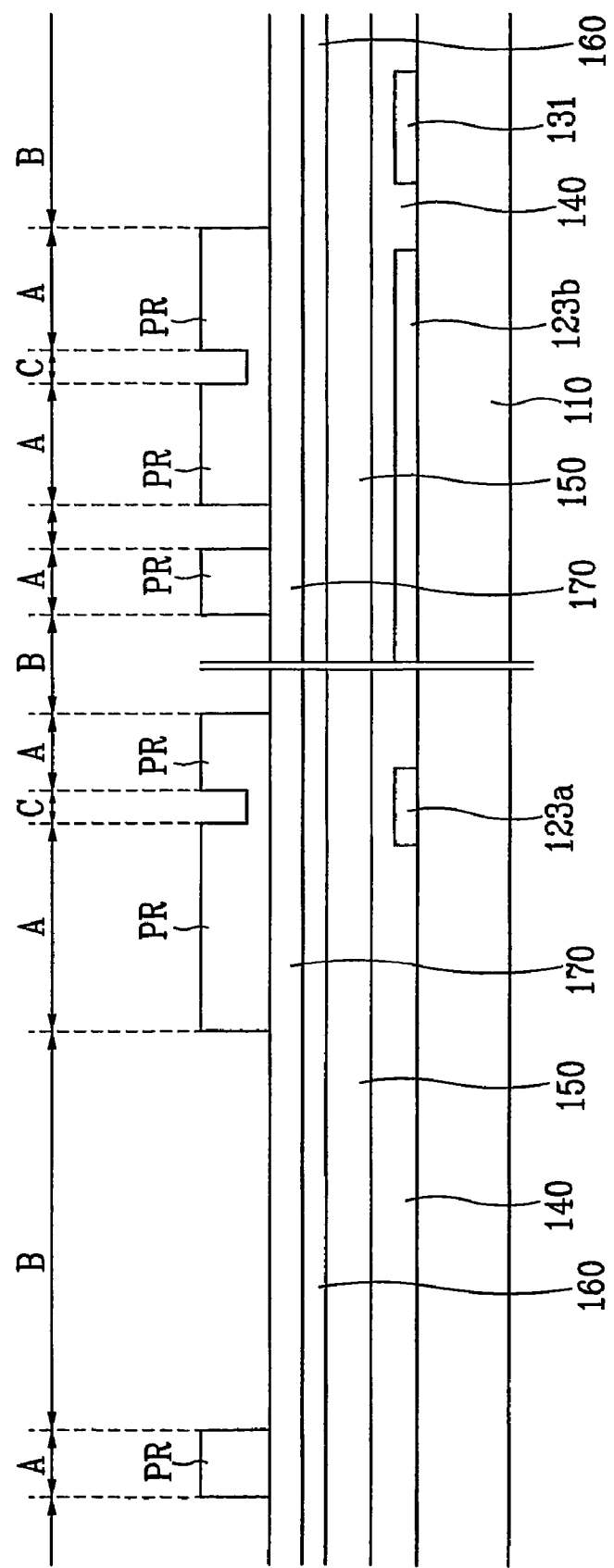

Thereafter, the photoresist film PR is exposed to light through a mask and is developed to form a photoresist pattern including a plurality of first portions PR1 and a plurality of second portions PR2 as shown in FIGS. 8A and 8B. Each second portion PR2 of the photoresist pattern PR1 and PR2 located on a channel area C of a TFT, which is placed between a source electrode 173a or 173b and a drain electrode 175a or 175b, is thicker than each first portion PR1 of the photoresist pattern located on a data area A where a data wire will be formed. All portions of the photoresist film PR on the remaining areas B are removed. Here, the ratio of the thickness of the photoresist pattern PR1 and PR2 on the channel area C and on the data area A is adjusted depending on process conditions of subsequent etching steps described later, and it is preferable that the thickness of the second portion PR2 is equal to or less than a half of that of the first portion PR1, for example, equal to or less than 4,000 Å. (Second Mask)

The position-dependent thickness of the photoresist pattern is obtained by several techniques. A slit pattern, a lattice pattern or a translucent film is provided on the mask in order to adjust the light transmittance in the area C.

When using a slit pattern, it is preferable that width of the slits and a gap between the slits is smaller than the resolution of an exposer used for the photolithography. In case of using a translucent film, thin films with different transmittances or different thickness may be used to adjust the transmittance on the masks.

When a photoresist film is exposed to light through such a mask, polymers of a portion directly exposed to the light are almost completely decomposed, and those of a portion exposed to the light through a slit pattern or a translucent film are not completely decomposed because the amount of a light irradiation is small. The polymers of a portion of the photoresist film blocked by a light-blocking film provided on the mask are hardly decomposed. After the photoresist film is developed, the portions containing the polymers, which are not decomposed, is left. At this time, the thickness of the portion with less light exposure is thinner than that of the portion without light exposure. Since too long exposure time decomposes all the molecules, it is necessary to adjust the exposure time.

The small thickness of the second portion PR2 of the photoresist pattern may be obtained using reflow. That is, the photoresist film is made of a reflowable material and exposed to light through a normal mask having opaque and transparent portions. The photoresist film is then developed and subject to reflow such that portions of the photoresist film flows down onto areas without photoresist, thereby forming thin portions.

Next, the photoresist pattern PR1 and PR2 and the underlying layers including the conductive layer 170, the contact layer 160 and the semiconductor layer 150 are etched such that the data wire and the underlying layers are left on the data areas A, only the semiconductor layer is left on the channel areas C, and all the three layers 170, 160 and 150 are removed to expose the gate insulating layer 140 on the remaining areas B.

Figure 9:
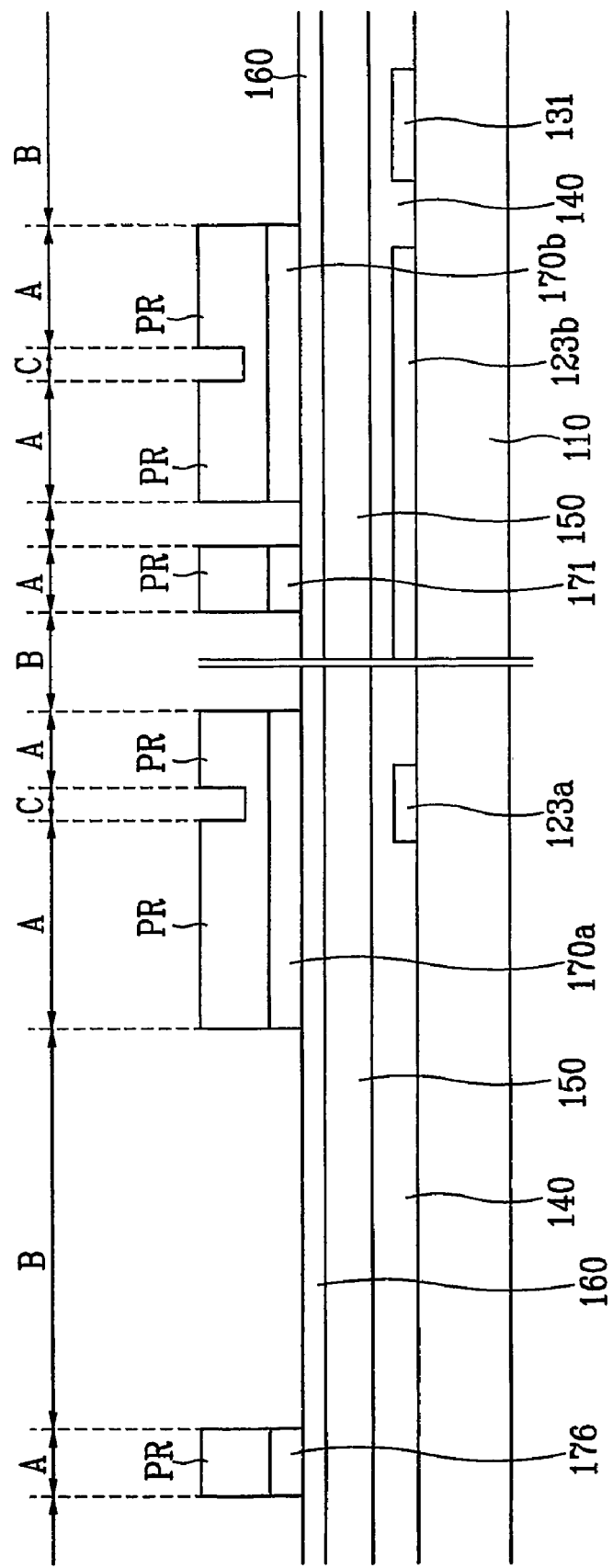

First, as shown in FIG. 9, the exposed portions of the conductive layer 170 on the other areas B are removed to expose the underlying portions of the contact layer 160. Both dry etch and wet etch are selectively used in this step and preferably performed under the condition that the conductive layer 170 is easily etched and the photoresist pattern PR1 and PR2 are hardly etched. However, since it is hard to identify the above-described condition for dry etch, and the dry etch may be performed under the condition that the photoresist pattern PR1 and PR2 and the conductive layer 170 are etched simultaneously. In this case, the second portions PR2 of the photoresist pattern on the channel areas C for dry etch are preferably made to be thicker than those for the wet etch to prevent the removal of the second portions PR2 of the photoresist pattern on the channel areas C and thus the exposure of the underlying portions of the conductive layer 170.

As a result, as shown in FIG. 9, only the portions 171, 170a and 170b of the conductive layer 170 on the channel areas C and the data areas A are left and the portions of the conductive layer 170 on the remaining areas B are removed to expose the underlying portions of the contact layer 160. Here, the data-wire conductors 171, 170a and 170b have substantially the same planar shapes as the data wire 171, 173a, 173b, 175a, 175b and 179 except that the source electrodes 173a and 173b and the drain electrodes 175a and 175b are not disconnected from but connected to each other.

When using dry etch, the thickness of the photoresist pattern PR1 and PR2 is reduced to an extent.

Next, as shown in FIG. 9, the exposed portions of the contact layer 160 and the underlying portions of the amorphous silicon layer 150 on the areas B as well as the second portions PR2 of the photoresist pattern on the channel areas C are removed by dry etch. The etching is performed under the condition that the photoresist pattern PR1 and PR2, the contact layer 160 and the semiconductor layer 150 are easily etched and the gate insulating layer 140 is hardly etched. (It is noted that etching selectivity between the intermediate layer and the semiconductor layer is nearly zero.) In particular, it is preferable that the etching ratios for the photoresist pattern PR1 and PR2 and the semiconductor layer 150 are nearly the same. For instance, the etched thicknesses of the photoresist pattern PR1 and PR2 and the semiconductor layer 150 can be nearly the same by using a gas mixture of $SF_6$ and HCl, or a gas mixture of $SF_6$ and $O_2$. When the etching ratios for the photoresist pattern PR1 and PR2 and for the semiconductor pattern 150 are the same, the initial thickness of the second portions PR2 of the photoresist pattern on the channel areas C is equal to or less than the sum of the thickness of the semiconductor layer 150 and the thickness of the contact layer 160.

Figure 10:
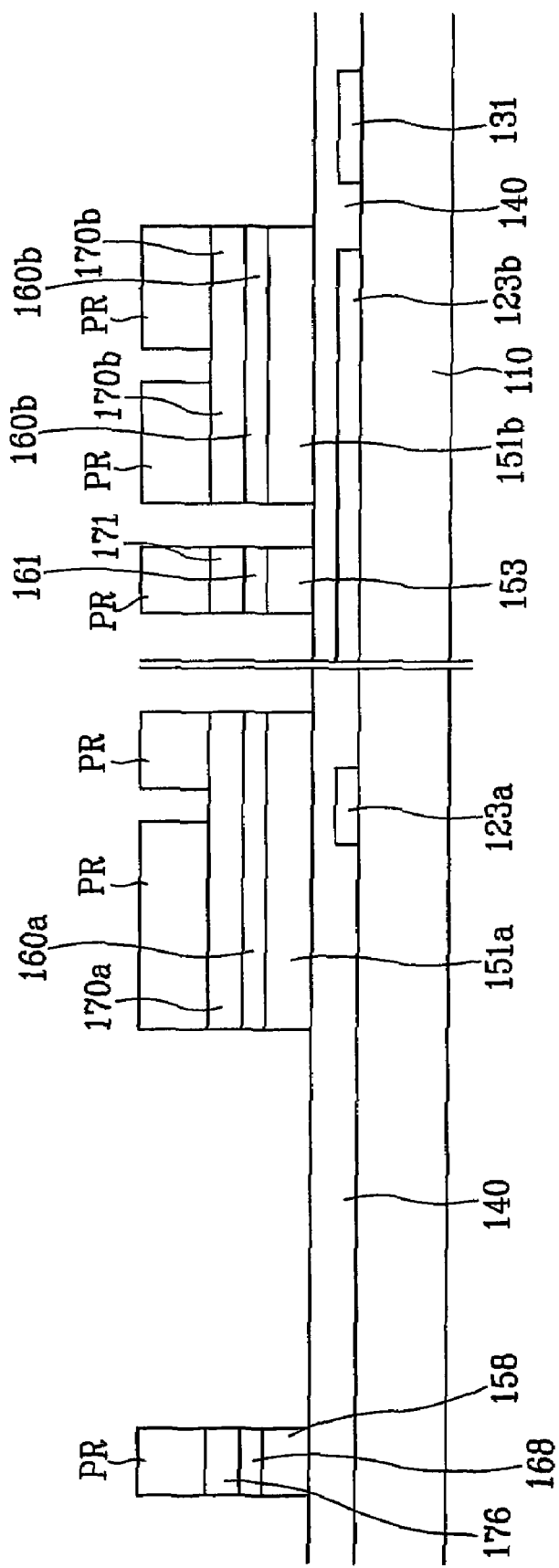

Consequently, as shown in FIG. 10, the second portions PR2 of the photoresist pattern on the channel areas C are removed to expose the underlying portions of source/drain ("S/D") conductors 170a and 170b, and the portions of the contact layer 160 and the semiconductor layer 150 on the remaining areas B are removed to expose the underlying portions of the gate insulating layer 140. In the meantime, the first portions PR1 of the photoresist pattern on the data areas A are also etched to become thinner. Moreover, the semiconductor pattern 151a, 151b, 153 and 158 is completed in this step. A plurality of ohmic contacts 161, 160a, 160b and 168 are formed on the semiconductor pattern 151a, 151b, 153 and 158.

Then, photoresist remnants left on the surface of the S/D conductors 170a and 170b on the channel areas C are removed by ashing.

Figure 11A:
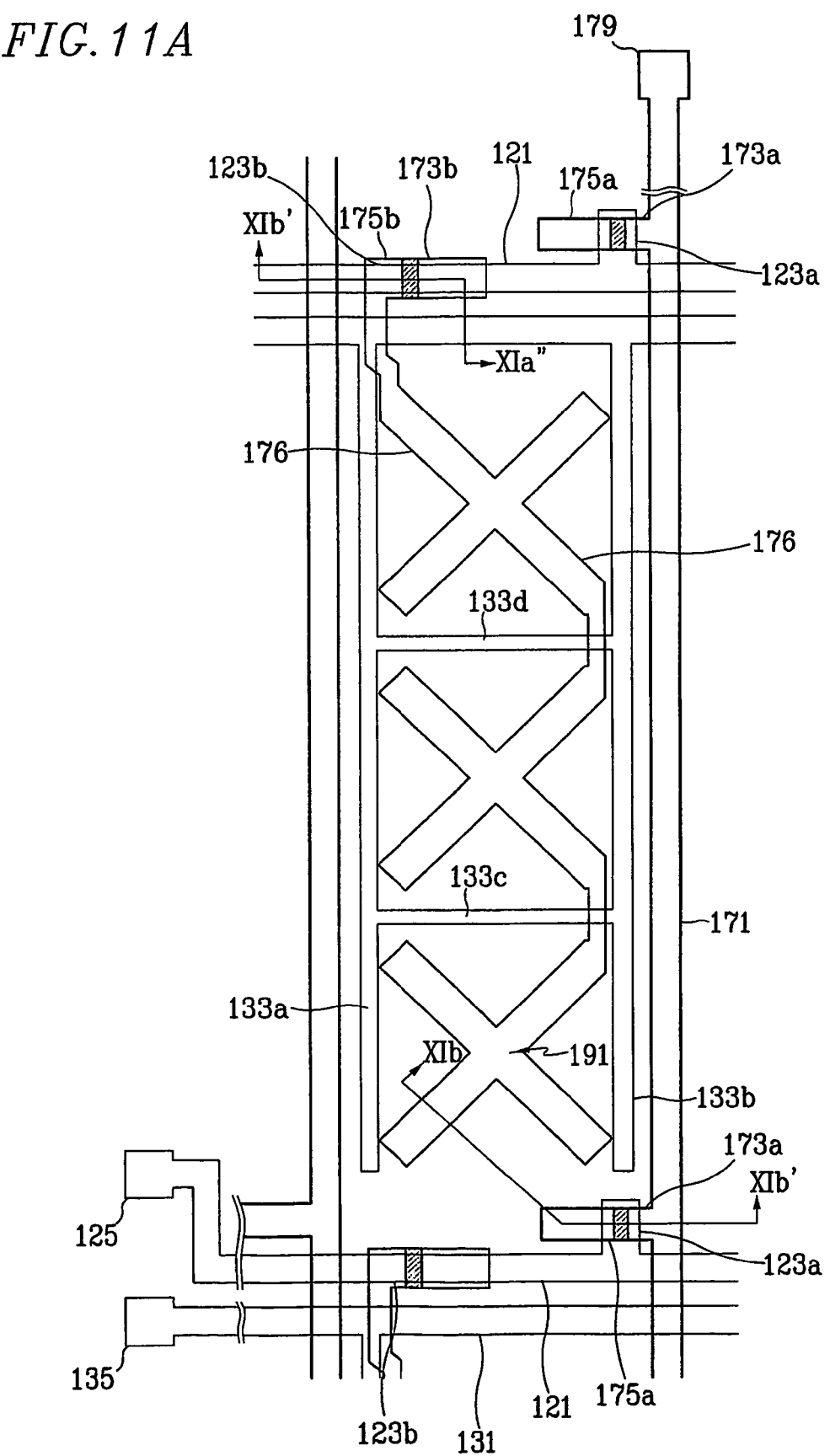
Figure 11B:
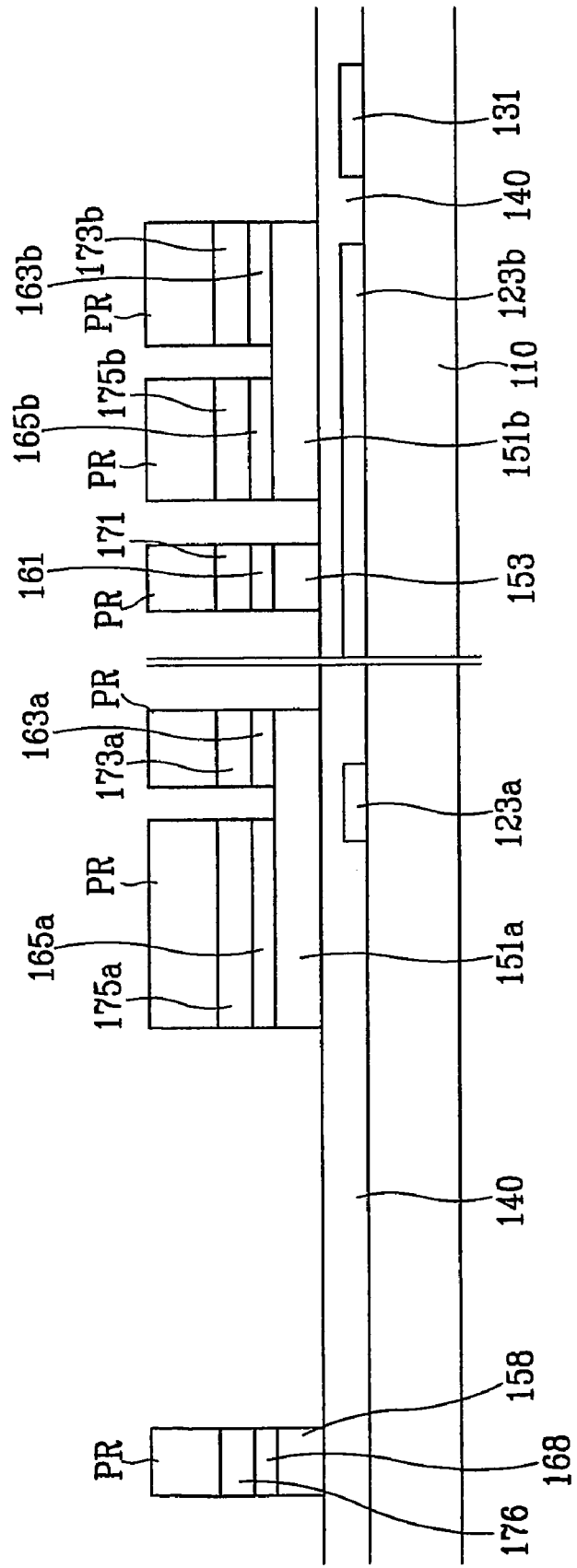

Next, as shown in FIGS. 11A and 11B, portions of the S/D conductors 170a and 170b and the underlying portions of the S/D ohmic contacts 160a and 160b on the channel areas C are etched to be removed. Here, the etching of both the S/D conductors 170a and 170b and the S/D ohmic contacts 160a and 160b may be done using only dry etching. Alternatively, the S/D conductors 170a and 170b are etched by wet etching and the S/D ohmic contacts 160a and 160b are etched by dry etching. In the former case, it is preferable to perform the etching under the condition that etching selectivity between the S/D conductors 170a and 170b and the S/D ohmic contacts 160a and 160b is high. It is because the low etching selectivity makes the determination of the etching finish point difficult, thereby causing the adjustment of the thickness of the portions of the semiconductor pattern 151a and 151b left on the channel areas C to be difficult. In the latter case alternately applying wet etching and dry etching, a stepwise lateral sidewall is formed since the wet etch etches the lateral sides of the S/D conductors 170a and 170b, while the dry etch hardly etches the lateral sides of the S/D ohmic contacts 160a and 160b. Examples of etching gases used for etching the S/D ohmic contacts 160a and 160b are a gas mixture of $CF_4$ and HCl and a gas mixture of $CF_4$ and $O_2$. Use of the gas mixture of $CF_4$ and $O_2$ enables to obtain uniform thickness of etched portions of the semiconductor pattern 151a and 151b. In this regard, the exposed portions of the semiconductor pattern 151a and 151b are etched to have a reduced thickness, and the first portions PR1 of the photoresist pattern on the data-wire areas A are also etched to have a reduced thickness. This etching is performed under the condition that the gate insulating layer 140 is not etched, and it is preferable that the photoresist pattern is thick enough to prevent the first portions PR1 of the photoresist pattern on the data-wire areas A from being removed to expose the underlying portions of the data wire 171, 173a, 173b, 175a, 175b and 179.

Accordingly, the source electrodes 173a and 173b and the drain electrodes 175a and 175b are separated from each other, and, simultaneously, the data wire 171, 173a, 173b, 175a, 175b and 179 and the ohmic contact pattern 161, 163a, 163b, 165a and 165b thereunder are completed.

Finally, the first portions PR1 of the photoresist pattern left on the data areas A are removed. Alternatively, the first portions PR1 of the photoresist pattern on the data areas A are removed after the portions of the S/D conductors 170a and 170b on the channel areas C are removed and before the underlying portions of the S/D ohmic contacts 160a and 160b are removed.

As described above, wet etching and dry etching may be performed one after the other, but only dry etching may be used. The latter is relatively simple but it is not easy to find a proper etching condition compared with the former. On the contrary, it is easy to find a proper etching condition for the former case but the former is relatively complicated compared with the latter.

Thereafter, as shown in FIGS. 4 and 5, a passivation layer 180 is formed by growing a-Si:C:O or a-Si:O:F by CVD, by depositing silicon nitride, or by coating an organic insulating material such as acryl-based material. When forming an a-Si:C:O layer, $SiH(CH_3)_3$, $SiO_2(CH_3)_4$, $(SiH)_4O_4(CH_3)_4$, $Si(C_2H_5O)$ or the like used as basic source, oxidant such as $N_2O$ or $O_2$, and Ar or He are mixed in gaseous states to flow for the deposition. For an s-Si:O:F layer, the deposition is performed with flowing a gas mixture including $SiH_4$, $SiF_4$ or the like and an additional gas of $O_2$. $CF_4$ may be added as a secondary source of fluorine.

As shown in FIGS. 4 and 5, the passivation layer 180 together with the gate insulating layer 140 is photo-etched to form a plurality of contact holes 181, 182, 183, 184, 185 and 186 exposing the first drain electrodes 175a, the second source electrodes 173b, the storage electrode lines 131, the gate pads 125, the storage pads 135 and the data pads 179. It is preferable that the area of the contact holes 184, 185 and 186 exposing the pads 125, 179 and 135 is equal to or larger than 0.5 nm×15 μm and not larger than 2 mm×60 μm. (Third Mask)

Finally, an ITO layer or an IZO layer with a thickness of 1500-500 Å is deposited and photo-etched to form a plurality of pixel electrodes 190 connected to the drain electrodes 175, a plurality of subsidiary gate pads 95 connected to the gate pads 125, a plurality of subsidiary data pads 97 connected to the data pads 179, and a plurality of bridges 92 connecting the second source electrodes 173b and the storage electrode lines 131. (Fourth Mask)

Since Cr etchant can be used as an etchant for an IZO layer, the exposed portions of the metal for the data wire and the gate wire through the contact holes are not corroded in the photo-etching step for forming the pixel electrodes 190, the subsidiary gate pads 95, the subsidiary data pads 97 and the bridges 92 from the IZO layer. An example of the Cr etchant is $(HNO_3/(NH_4)_2Ce(NO_3)_6/H_2O)$. The IZO layer is deposited at temperature preferably in a range from a room temperature to 200° C. for minimizing the contact resistance at the contacts. A preferred example of a target for the IZO layer includes $In_2O_3$ and ZnO. The content of ZnO is preferably in a range between 15 atm % and 20 atm %.

Meanwhile, nitrogen gas is preferably used for the pre-heating process before the deposition of the ITO layer or the IZO layer. This is to prevent the formation of metal oxides on portions of the metallic layers exposed through the contact holes 181, 182, 183, 184, 185 and 186.

Figure 12:
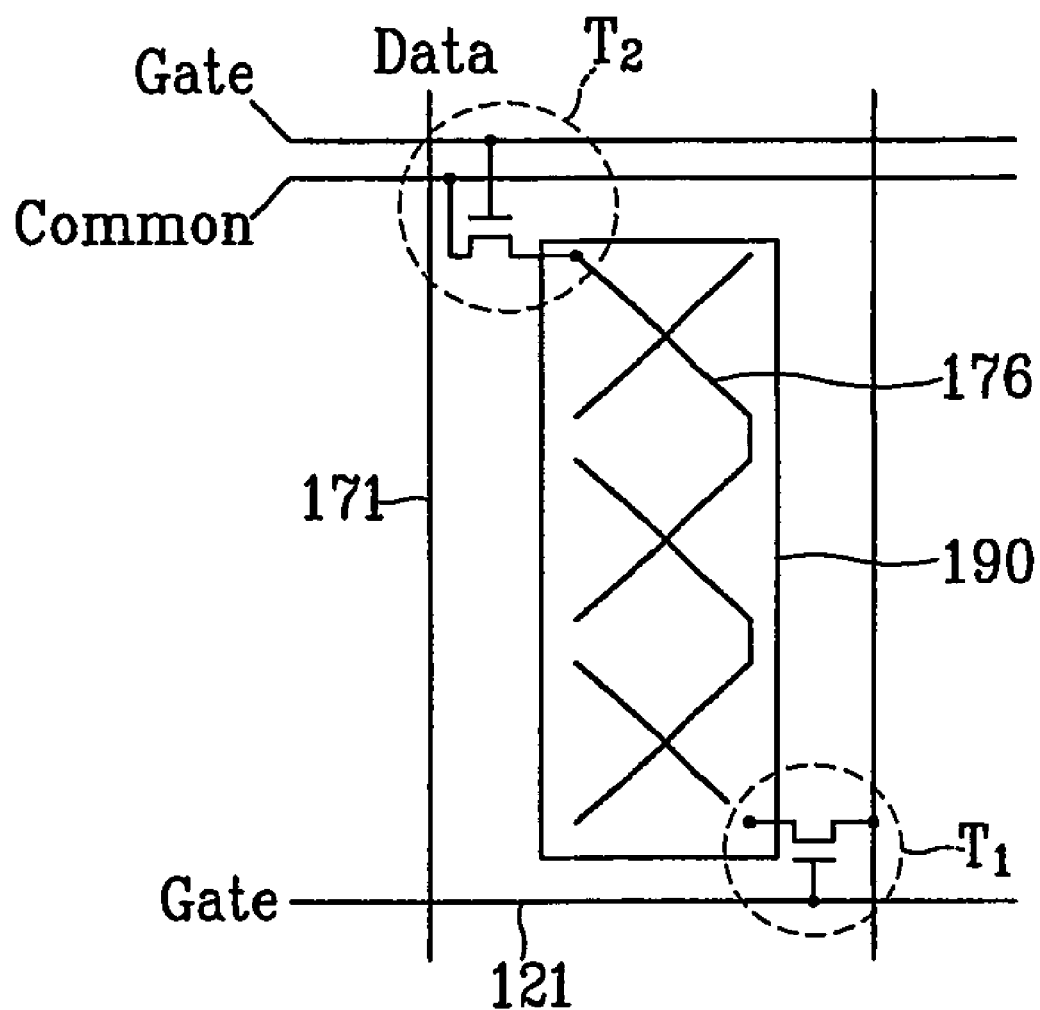
FIG. 12 is a schematic diagram of TFT array panels for an LCD according to first and second embodiments of the present invention.

FIG. 12 is a schematic diagram of the TFT array panels for an LCD shown in FIGS. 2A and 4 according to an embodiment of the present invention.

A TFT T1 connected to a data line 171 switches signals transmitted to a pixel electrode 190 while a TFT T2 connected to a storage electrode line switches signals entering a DCE 176. The pixel electrode 190 and the DCE 176 are capacitively coupled. For the same gray, there is no variation of the potential difference between the DCE 176 and the pixel electrode 190. Therefore, stability of image quality is ensured irrespective of inversion types such as line inversion, dot inversion or the like. Furthermore, there is an advantage that there is no increase of the load of the data lines.

Figure 13:
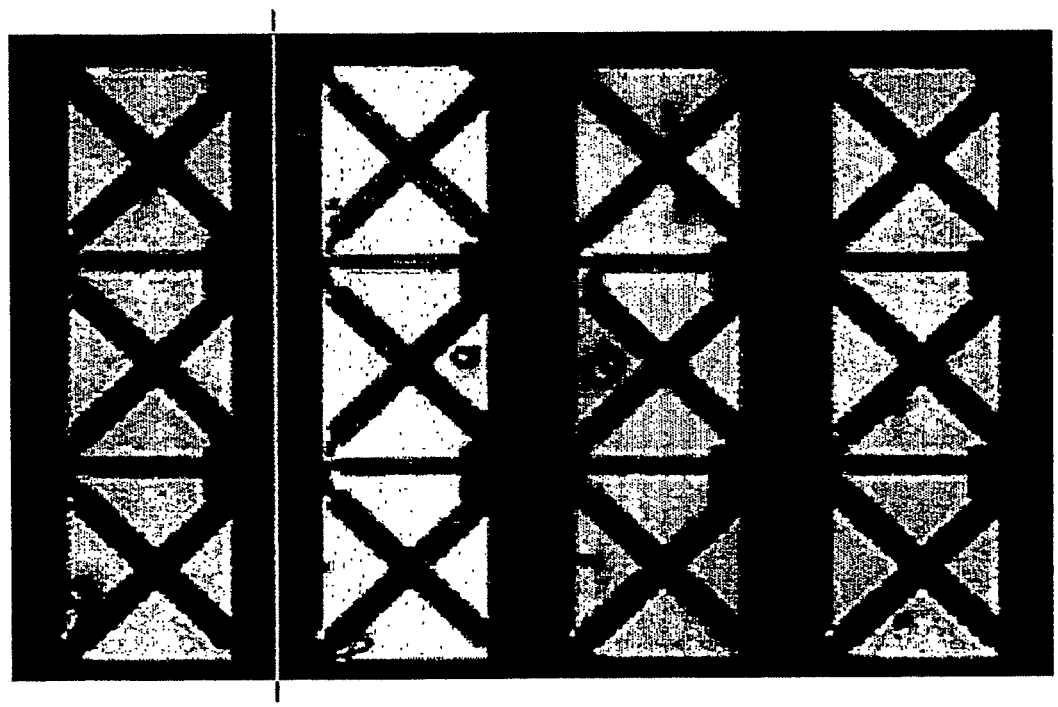
FIG. 13 is a picture image on an LCD according to an embodiment of the present invention.

FIG. 13 is a picture image on an LCD according to an embodiment of the present invention.

As shown in FIG. 13, an LCD according to the present invention shows excellent image quality with reduced unstable textures.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, there is no variation of the potential difference between the DCE 176 and the pixel electrode 190 for the same gray, by making a TFT connected to a data line 171 switch signals transmitted to a pixel electrode 190 while a TFT connected to a storage electrode line switch signals entering a DCE 176 and by capacitively coupling the pixel electrode 190 and the DCE 176. Therefore, stability of image quality is ensured irrespective of inversion types such as line inversion, dot inversion or the like. Furthermore, there is an advantage that there is no increase of the load of the data lines.

What is claimed is:

1. A thin film transistor array panel comprising:
an insulating substrate;
a plurality of first signal lines formed on the insulating substrate;
a plurality of second signal lines formed on the insulating substrate, insulated from the first signal lines, and intersecting the first signal lines;
a plurality of third signal lines formed on the insulating substrate, insulated from the second signal lines, and intersecting the second signal lines;
a plurality of pixel electrodes provided on respective pixel areas defined by the intersections of the first and the second signal lines, each pixel electrode having a cutout;
a plurality of direction control electrodes provided on the respective pixel areas defined by the intersections of the first and the second signal lines;
a plurality of first thin film transistors, each first thin film transistor connected to one of the first signal lines, one of the second signal lines, and one of the pixel electrodes; and a plurality of second thin film transistors, each second thin film transistor connected to one of the first signal lines, one of the third signal lines, and one of the direction control electrodes.

2. The thin film transistor array panel of claim 1, wherein one of the first thin film transistors and one of the second thin film transistor located on one of the pixel areas are connected to a relevant one of the first signal lines and a previous one of the first signal lines.

3. The apparatus of claim 1, wherein the direction control electrode overlaps the cutouts of the pixel electrode at least in part.

4. A thin film transistor array panel comprising:
an insulating substrate;
a gate wire formed on the insulating substrate and including first and second gate electrodes and a plurality of gate lines;
a storage electrode wire formed on the insulating substrate and including a plurality of storage electrode lines and a plurality of storage electrodes;
a gate insulating layer formed on the gate wire and the storage electrode wire;
a semiconductor layer formed on the gate insulating layer;
a data wire formed on the semiconductor layer and including a plurality of data lines intersecting the gate lines, a plurality of first source electrodes connected to the data lines, a plurality of first drain electrodes opposite the first source electrodes with respect to the first gate electrodes, a plurality of second source electrodes electrically connected to the storage electrode wire, and a plurality of second drain electrodes opposite the second source electrodes with respect to the second gate electrodes;
a direction control electrode connected to the second drain electrode;
a passivation layer formed on the data wire and the direction control electrode and having a plurality of contact holes; and
a pixel electrode formed on the passivation layer, having a plurality of cutouts, and electrically connected to the first drain electrodes through the contact holes.

5. The thin film transistor array panel of claim 4, where in the direction control electrode overlaps the cutouts of the pixel electrode at least in part.

6. The thin film transistor array panel of claim 5, wherein the cutouts of the pixel electrode comprise a plurality of X-shaped cutouts and a plurality of rectilinear cutouts and the direction control electrode overlaps the X-shaped cutouts.

7. The thin film transistor array panel of claim 5, wherein the semiconductor layer comprises a plurality of data portions disposed under the data lines, a plurality of first channel portions disposed under the first source electrodes and the first drain electrodes, and a plurality of second channel portions disposed under the second source electrodes and the second drain electrodes.

8. The thin film transistor array panel of claim 4, further comprising a plurality of connecting members formed on the passivation layer and connecting the second source electrodes and the storage electrode wire through contact holes provided at the passivation layer and the gate insulating layer.

9. The thin film transistor array panel of claim 5, wherein the direction control electrode includes substantially the same layer and material as the data wire.

10. A liquid crystal display comprising:
a first insulating substrate;
a plurality of first signal lines formed on the first insulating substrate;
a plurality of second signal lines formed on the first insulating substrate, insulated from the first signal lines, and intersecting the first signal lines;
a plurality of third signal lines formed on the first insulating substrate, insulated from the second signal lines, and intersecting the second signal lines;
a plurality of pixel electrodes provided on the respective pixel areas defined by the intersections of the first and the second signal lines, each pixel electrode having a cutout;
a plurality of direction control electrodes provided on the respective pixel areas defined by the intersections of the first and the second signal lines;
a plurality of switching elements, each first switching element connected to one of the first signal lines, one of the second signal lines, and one of the pixel electrodes;
a plurality of second thin film transistors, each second switching element connected to one of the first signal lines, one of the third signal lines, and one of the direction control electrodes;
a second insulating substrate opposite the first insulting substrate;
a common electrode formed on the second insulating substrate; and
a liquid crystal layer interposed between the first insulating substrate and the second insulating substrate.

11. The liquid crystal display of claim 10, wherein the third signal lines are supplied with a voltage to be applied to the common electrode.

12. The liquid crystal display of claim 11, wherein the liquid crystal layer has negative dielectric anisotropy and major axes of liquid crystal molecules in the liquid crystal layer are aligned vertical to the first and the second substrates.

13. The liquid crystal display of claim 11, wherein the liquid crystal layer has positive dielectric anisotropy and major axes of liquid crystal molecules in the liquid crystal layer are aligned parallel to the first and the second substrates.

14. The apparatus of claim 10, wherein the direction control electrode overlaps the cutouts of the pixel electrode at least in part.

15. A thin film transistor array panel comprising:
an insulating substrate;
a gate wire formed on the insulating substrate;
a storage electrode wire formed on the insulating substrate;
a gate insulating layer formed on the gate wire and the storage electrode wire;
a data wire formed on the gate insulating layer including three layers an amorphous silicon layer, a doped amorphous silicon layer, and a metal layer;
a direction control electrode formed on the gate insulating layer, including three layers an amorphous silicon layer, a doped amorphous silicon layer, and a metal layer, and electrically connected to the second drain electrode;
a passivation layer formed on the data wire and the direction control electrode and having a plurality of contact holes; and a pixel electrode formed on the passivation layer, having a plurality of cutouts, and electrically connected to the data wire through the contact holes.

16. The thin film transistor array panel of claim 15, wherein the gate wire comprises first and second gate electrodes, the data wire comprises first and second source electrodes and first and second drain electrodes, the direction control electrode is connected to the second drain electrode, the pixel electrode is connected to the first drain electrode, and the second source electrode is connected to the storage electrode wire.

17. The thin film transistor array panel of claim 16, further comprising a connecting member formed on the passivation layer and connecting the second source electrode and the storage electrode wire through a contact hole provided at the passivation layer and the gate insulating layer.

18. A method of manufacturing a thin film transistor array panel, comprising:
    forming a gate wire and a storage electrode wire;
    depositing a gate insulating layer, an amorphous silicon layer, a contact layer, and a metal conductive layer;
    patterning the amorphous silicon layer, the contact layer, and the metal conductive layer to form a data wire, a direction control electrode, and a channel portion of a thin film transistor;
    forming a passivation layer on the channel portion;
    forming a pixel electrode on the passivation layer;
    forming a plurality of connecting members on the passivation layer;
    forming a plurality of source electrodes electrically connected to the storage electrode wire; and
    connecting the source electrodes and the storage electrode wire through contact holes provided at the passivation layer and the gate insulating layer.

19. The method of claim 18, wherein the pixel electrode includes a plurality of cutouts, the direction control electrode overlaps the cutouts of the pixel electrode at least in part.

* * * * *